(12) United States Patent  
Min

(10) Patent No.: US 6,654,142 B1  
(45) Date of Patent: Nov. 25, 2003

(54) IMAGE DATA PROCESSOR

(75) Inventor: Kyoung-cheol Min, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/425,948

(22) Filed: Oct. 25, 1999

(30) Foreign Application Priority Data

Oct. 23, 1998 (KR) .............................. 98-44572

(51) Int. Cl.$^7$ ........................... G06K 15/00; G06K 9/00

(52) U.S. Cl. ................... 358/1.9; 358/3.27; 382/169

(58) Field of Search ................... 358/3.13, 3.16, 358/3.21, 1.9, 3.27; 382/169

(56) References Cited

U.S. PATENT DOCUMENTS 5,031,050 A  *  7/1991  Chan .......................... 358/298

FOREIGN PATENT DOCUMENTS

| EP | 0444290 A2 | * | 4/1991 | ............ H04N/1/46 |
| JP | 2001-158132 | * | 6/2001 | ............ H04N/1/40 |
| KR | 1991-6879 | | 4/1991 | ............ G06K/9/20 |
| KR | 1997-17143 | | 4/1997 | ............ G09G/3/36 |

OTHER PUBLICATIONS

"Notice to Submit Response" corresponding to the Korean Patent Application No. 10–1998–0044572, dated Jan. 31, 2002, issued by Korean Industrial Property Office.

* cited by examiner

*Primary Examiner*—Jerome Grant, II  
(74) *Attorney, Agent, or Firm*—Robert E. Bushnell, Esq.

(57) ABSTRACT

An image data processor for processing image data input with gray scale information corresponding to pixels in response to the number of divided-per-pixel gray scale levels that can be expressed by an image reproducing apparatus, the processor including a quantization portion for dividing gray scale values corresponding to the pixels of input image data by a comparison reference value set to about a gray scale between gray scale levels in which the image reproducing apparatus can express a pixel, and separately outputting the quotients and remainders of the division, a dithering portion for comparing the element values in a set dithering matrix with the remainder values at corresponding comparison positions and outputting the results of the comparison as binary bits, and a mixer for adding the quotients output by the quantization portion to the binary bits output by the dithering portion and outputting the sum to the image reproducing apparatus. The image data processor allows the image reproducing apparatus, capable of expressing a pixel in only a few gray scale levels, to reproduce an image having a gray scale similar to that of the original image data without greatly degrading the resolution of the image.

20 Claims, 5 Drawing Sheets

| 73 | 50 | 28 | 78 |
|----|----|----|----|
| 22 | 0  | 11 | 55 |
| 44 | 17 | 6  | 33 |
| 67 | 39 | 61 | 84 |

FIG.4

| a | | | | | | | |
|---|---|---|---|---|---|---|---|
| 51 | 14 | 31 | 16 | . | . | . | . |
| 55 | 23 | 100 | 13 | . | . | . | . |
| 53 | 41 | 87 | 115 | . | . | . | . |
| 61 | 45 | 18 | 98 | . | . | . | . |
| . | . | . | . | 23 | 14 | 51 | 55 |
| . | . | . | . | 66 | 77 | 30 | 12 |
| . | . | . | . | 216 | 242 | 222 | 167 |
| . | . | . | . | 221 | 210 | 111 | 153 | b

FIG. 5A

| 0 | 0 | 0 | 0 |
|---|---|---|---|
| 0 | 0 | 1 | 0 |
| 0 | 0 | 1 | 1 |
| 0 | 0 | 0 | 1 |

FIG. 5B

| 0 | 0 | 0 | 0 |
|---|---|---|---|
| 0 | 0 | 0 | 0 |
| 2 | 2 | 2 | 1 |
| 2 | 2 | 1 | 1 |

FIG. 6A

| 0 | 0 | 1 | 0 |
|---|---|---|---|
| 1 | 1 | 1 | 0 |
| 1 | 1 | 0 | 0 |
| 0 | 1 | 0 | 0 |

FIG. 6B

| 0 | 0 | 1 | 0 |
|---|---|---|---|
| 1 | 1 | 1 | 0 |
| 1 | 1 | 1 | 1 |
| 0 | 1 | 0 | 0 |

FIG. 7

|   | a1 |   |   |   |   |   |   |
|---|---|---|---|---|---|---|---|
| 0 | 0 | 0 | 0 | · | · | · | · |
| 1 | 1 | 2 | 0 | · | · | · | · |
| 1 | 1 | 1 | 1 | · | · | · | · |
| 0 | 1 | 0 | 1 | · | · | · | · |
| · | · | · | · | 0 | 0 | 1 | 0 |
| · | · | · | · | 1 | 1 | 1 | 0 |
| · | · | · | · | 3 | 3 | 3 | 2 |
| · | · | · | · | 2 | 3 | 1 | 1 | b1

FIG. 8

IMAGE DATA PROCESSOR

This application makes reference to, incorporates the same herein, and claims all benefits accruing under 35 U.S.C. §119 from an application entitled IMAGE DATA PROCESSOR earlier filed in the Korean Industrial Property Office on Oct. 23, 1998, and there duly assigned Ser. No. 44572/1998, a copy of which is annexed hereto.

BACKGROUND OF THE INVENTION

1. Technical Field

The present invention relates to an image data processor, and more particularly, to an image data processor for processing image data input having gray scale information.

2. Related Art

Image reproducing apparatuses include cathode ray tubes (CRTs), liquid crystal displays (LCDs), ink jet printers, laser printers, photocopiers and other devices. Such image reproducing devices receive image data obtained by photographing an object or scanning an object using a scanner, and reproduce the received image data on a recording paper or a screen.

I have found that there is a need to provide an improved image data processor for efficiently and conveniently processing data.

SUMMARY OF THE INVENTION

It is an object of the present invention to provide an improved image data processor to more efficiently and conveniently process data.

It is a further object of the present invention to provide an image data processor for processing received image data into data suitable for an image reproducing apparatus, so that the resolution and gradation of a reproduced image is not greatly degraded.

Accordingly, to achieve the above objects and others, the present invention provides an image data processor for processing image data input with gray scale information corresponding to pixels in response to the number of divided-per-pixel gray scale levels that can be expressed by an image reproducing apparatus and for outputting the processed image data to the image reproducing apparatus, the processor including: a quantization portion for dividing gray scale values corresponding to the pixels of input image data by a comparison reference value set to about a gray scale between gray scale levels in which the image reproducing apparatus can express a pixel, and separately outputting the quotients and remainders of the division; a dithering portion for comparing the element values in a set dithering matrix with the remainder values at corresponding comparison positions and outputting the results of the comparison as binary bits; and a mixer for adding the quotients output by the quantization portion to the binary bits output by the dithering portion and outputting the sum to the image reproducing apparatus.

Preferably, a quotient obtained by dividing a maximum gray scale value in which the image data is expressed, by a value obtained by subtracting one from the number of gray scale levels in which the image reproducing apparatus can express for each pixel, can be set as the comparison reference value of the quantization portion. Also, it is preferable that the element values in the dithering matrix are set to gradually increase in the direction from the center to the periphery of the matrix.

The image data processor further includes a gamma compensating portion installed before the quantization portion for compensating for the gray scale values of the image data in accordance with the gradation reproduction characteristics of the image reproducing apparatus in order to compensate for the difference generated between a recording concentration reproduced by the image reproducing apparatus and a recording concentration corresponding to the gray scale value when the gray scale value of the image data is input to the quantization portion without change.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 3 shows an example of a dithering matrix used in the dithering portion of FIG. 1;

FIG. 4 shows some of the gray scale values of input image data, the gray scale values displayed in the positions of corresponding pixels for illustrating data processing performed in the image data processor of FIG. 1;

FIG. 5A is a view illustrating the data of a quotient obtained by processing the image data in block a in FIG. 4 using a quantization portion;

FIG. 5B is a view illustrating the data of a quotient obtained by processing the image data in block b in FIG. 4 using a quantization portion;

FIG. 6A is a view illustrating the results of comparison by a dithering portion which compared the remainder data output by the quantization portion which processed the image data in block a in FIG. 4, with the dithering matrix of FIG. 3;

FIG. 6B is a view illustrating the results of comparison by a dithering portion which compared the remainder data output by the quantization portion which processed the image data in block b in FIG. 4, with the dithering matrix of FIG. 3;

FIG. 7 shows the data of the results of the image data of FIG. 4 processed by a mixer;

FIG. 8 shows the results of an image expressed on a recording target area by a four-level image reproducing apparatus on the basis of the data of FIG. 7 output by the mixer;

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Most cathode ray tubes (CRTs) and liquid crystal displays (LCDs) can display one of 256 gray levels per pixel. However, most printing machines such as ink jet printers, laser printers, and photocopiers can print only a few gray levels per pixel. A dithering method can be used to increase the gradation reproducing ability of a binary image reproducing apparatus capable of displaying one pixel region either in an on-state or an off-state.

In the dithering method, the element values within a set dithering matrix are compared with the values in corresponding positions of a pixel group within image data, the pixel group having the same elements as the dithering matrix. Only gray scale values of the image data which are greater than the corresponding element values of the dithering matrix, are processed as "on-state" data which is allowed to be printed. This process is performed by repeatedly comparing as many image data values as the number of elements of the dithering matrix at a time to process the image data of an entire image, and the results of this process are output to an image reproducing apparatus.

In the process for appropriately converting image data expressed as 256 levels for each pixel to data that can be applied to a binary image reproducing apparatus using a dithering matrix, an increase in columns and rows of the dithering matrix, which becomes a gradation reproducing block unit, can reduce a great degradation in gradation reproducibility. However, when the number of elements of the dithering matrix is increased, the resolution of a reproduced image is degraded.

A development of new techniques can result in printers capable of displaying one pixel region as a plurality of segmented regions.

Figure 1:
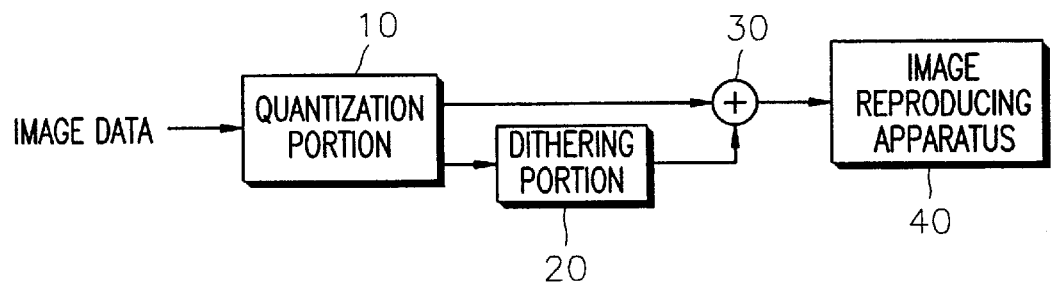
FIG. 1 is a block diagram illustrating an image data processor according to a preferred embodiment of the present invention.

Referring to FIG. 1, an image data processor according to an embodiment of the present invention includes a quantization portion 10, a dithering portion 20, and a mixer 30. An image reproducing apparatus 40 reproduces an image, corresponding to data output by the mixer 30, on a recording target, for example, a recording paper.

The processing method performed by the image data processor is determined by the number of gray scale levels which are obtained by segmenting a pixel area and can be expressed by the image reproducing apparatus 40 to which input image data is applied. An image data processing method for the four-level image reproducing apparatus 40 for segmenting a pixel area into four levels and expressing the segmented four levels will now be described as an example. Different processing methods for the image reproducing apparatus 40 having three or five expressible gray scale levels will also be described.

Figure 2A:
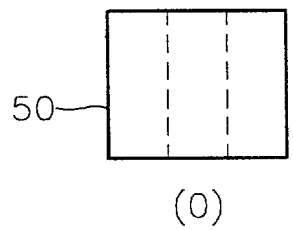
FIGS. 2A through 2D are views illustrating pixel areas expressed in four gray scale levels when an image reproducing apparatus can express a pixel area in the four gray scale levels.
Figure 2B:
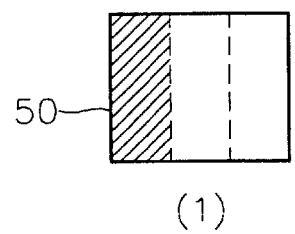
Figure 2C:
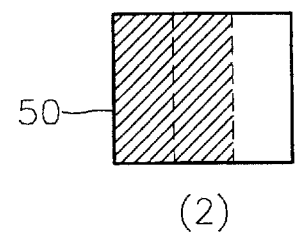
Figure 2D:
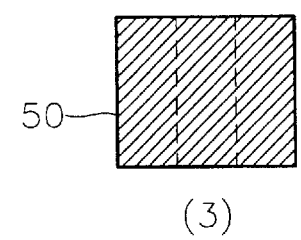

The four-level image reproducing apparatus 40 segments one pixel area into three areas and expresses gradation by setting one segmented area as a minimum display area. Thus, the four-level image reproducing apparatus 40 can display one pixel area in a first gray scale level in which the entire pixel area is not displayed, a second gray scale level in which only one third of the pixel area is displayed, a third gray scale level in which only two thirds of the pixel area is displayed, and a fourth gray scale level in which the entire pixel area is displayed. As to gray scale levels that the four-level image reproducing apparatus 40 can reproduce, FIG. 2A shows a pixel area 50 which is displayed in the first gray scale level, FIG. 2B shows a pixel area 50 which is displayed in the second gray scale level, FIG. 2C shows a pixel area 50 which is displayed in the third gray scale level, FIG. 2D shows a pixel area 50 which is displayed in the fourth gray scale level. A number put in parentheses in each of FIGS. 2A through 2D denotes a data value input to the image reproducing apparatus 40 in response to each display level, the data value obtained through image data processing to be described later.

A process for increasing the image gradation expressibility of the four-level image reproducing apparatus 40 with respect to typical contiguous gradation image data input as gray scale information for 256 levels will now be described.

First, gray scale values corresponding to the respective gray scale levels of the four-level image reproducing apparatus 40 will be described. A gray scale value is 0 in the first gray scale level, a gray scale value is 85 in the second gray scale level, a gray scale value is 170 in the third gray scale level, and a gray scale value is 255 in the fourth gray scale level. Thus, the comparison reference value of the quantization portion 10 is set to about 85 which is a gray scale value between gray scale levels in which a pixel is expressed by the image reproducing apparatus 40. It is preferable that the comparison reference value of the quantization portion 10 is set to a quotient obtained by dividing the maximum gray scale value of the input image data by a value obtained by subtracting one from the number of gray scale levels able to be expressed by the applied image reproducing apparatus 40. For example, in the three-level image reproducing apparatus 40, its comparison reference value can be set to about 127 or 128, and in a five-level image reproducing apparatus, its comparison reference value can be set to about 63 or 64.

When the comparison reference value is set in this way, the quantization portion 10 divides the gray scale values of input pixel data by the comparison reference value and outputs the quotients and remainders of the gray scale values.

The dithering portion 20 compares the element values of a set dithering matrix with the remainders of pixel data in positions corresponding to the element values, and outputs the results of to the comparison as one of binary bits 0 and 1. The gray scale reproducibility can be improved by increasing the number of elements in the dithering matrix, but the number of elements is appropriately selected in consideration of resolution. After the number of elements in the dithering matrix is determined, the value of each element is selected and determined so that it is within the remainder value. Preferably, element values are selected so that the difference between them is approximately equal to or slightly greater than the quotient obtained by dividing the maximum remainder, which can be output from the quantization portion 10, by the number of elements, and the selected element values are arranged at predetermined positions in the matrix. It is preferable that the elements are arranged within the dithering matrix so that their values are gradually increases in the direction from the center to the periphery of the matrix.

For example, when a 3×3 matrix is selected as the dithering matrix, 9 element values in which there is a difference of 10 or 11 between adjacent element values are selected between 0 and 84, and arranged in a predetermined pattern, thereby constituting the dithering matrix. When a 4×4 matrix is selected as the dithering matrix, an example of the configuration of the dithering matrix is shown in FIG. 3. In FIG. 3, element values in which there is a difference of 5 or 6 between adjacent element values are arranged, starting from 0, such that they increases in the direction from the center to the periphery of the matrix. The mixer 30 adds the values output by the quantization portion 10 to those output by the dithering portion 20, and outputs the sum to the image reproducing apparatus 40.

An image data processing method for the four-level image reproducing apparatus 40 performed by the above-described image data processing apparatus, will now be described by applying the dithering matrix of FIG. 3, for when image data having the values as shown in FIG. 4 is input.

First, when the comparison reference value of the quantization portion 10 is set to 85, each of the pixel data values in a block a of FIG. 4, comprised of 16 pixel data values set as a gray scale expression unit block, is divided by 85, and the quotients obtained by this division are shown in FIG. 5A. Also, it can be seen that quotients obtained with respect to a block b of FIG. 4 are shown in FIG. 5B. The quotients are output to the mixer 30.

The quantization portion 10 outputs the remainder of the division of each pixel data by the comparison reference value 85, to the dithering portion 20. The dithering portion 20 compares the division remainders of pixel data of 4 columns and 4 rows with 16 elements in the dithering matrix. Accordingly, a remainder value greater than or equal to a corresponding element value in the dithering matrix is output as 1, and a remainder value smaller than a corresponding element value in the dithering matrix is output as 0. The entire image data for an image is processed by repeating a comparison of 4×4 pixel data with a dithering matrix. As a consequence, the output values of the dithering portion 20 with respect to the block a of FIG. 4 are obtained as shown in FIG. 6A, and the output values of the dithering portion 20 with respect to the block b of FIG. 4 are obtained as shown in FIG. 6B.

Figures 7, 8:
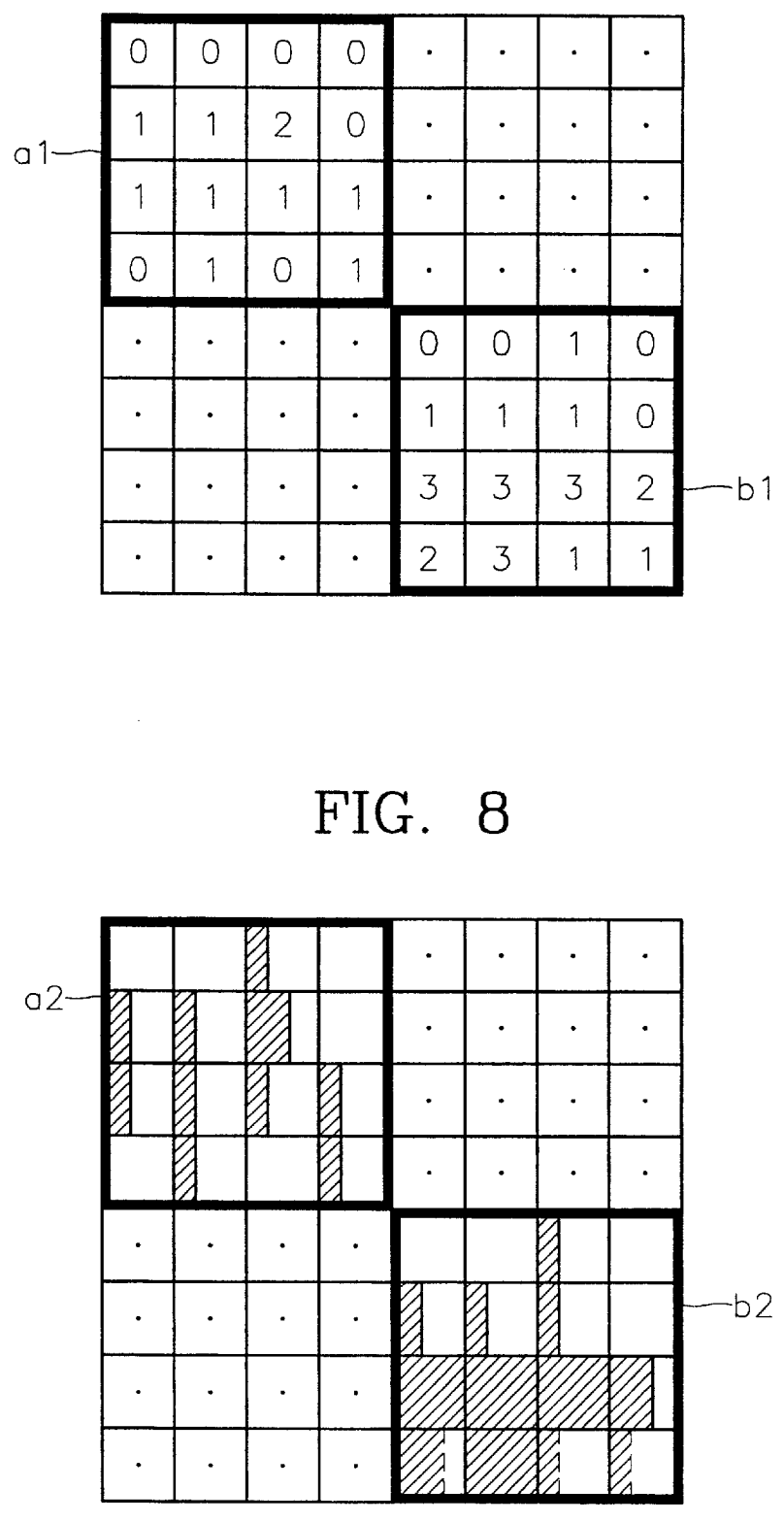

The mixer 30 adds a quotient of initial image data output by the quantization portion 10 to a binary bit output by the dithering portion 20 with respect to the same pixel position, and outputs the sum to the image reproducing apparatus 40. The resultant values processed by the mixer 30 with respect to the blocks a and b of FIG. 4 are shown in FIG. 7, and the results that the image reproducing apparatus 40 reproduces on a recording target in response to the data output by the mixer 30, are shown in FIG. 8.

Referring to the above process, when the set dithering matrix is comprised of n elements and the image reproducing apparatus 40 has L gradation expressible levels per pixel, the gradation reproduction level of n pixel data input with gray scale information minutely divided per pixel can be subdivided and extended into (n+1)×(L−1) levels. That is, when the four-level image reproducing apparatus 32, 55, 33, 56, 33, 31, 40 is applied, and a 3×3 dithering matrix is adopted, the image reproducing apparatus 40 can display 30 (={(3×3)+1}×(4−1)) divided gradation steps by setting 9 pixel areas as a gradation reproduction unit block.

Meanwhile, when a recording concentration reproduced by the image reproducing apparatus 40 is different from image data according to the characteristics of the image reproducing apparatus 40, it is preferable to compensate for the difference during data processing.

Figure 9:
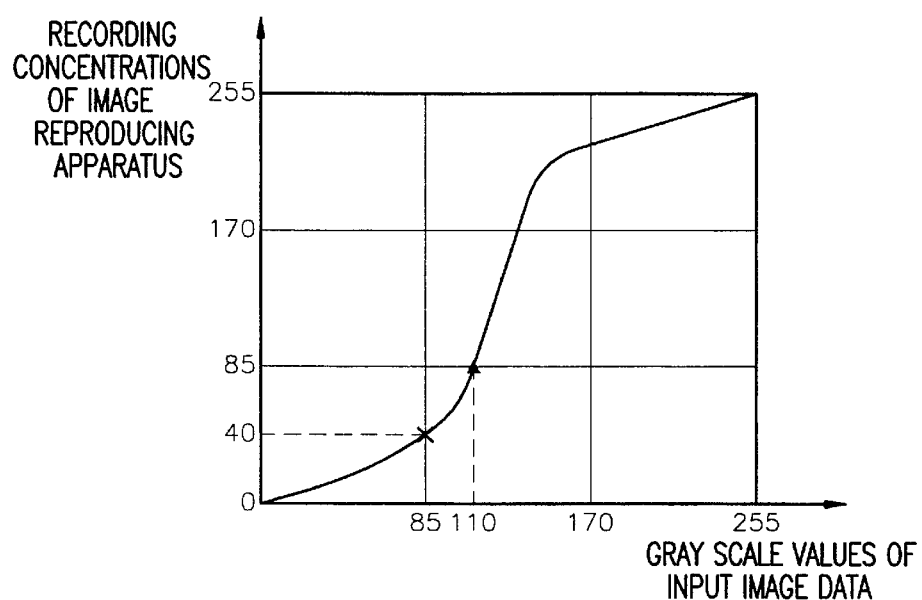
FIG. 9 is a graph showing an example of the recording concentration reproduced with respect to the gray scale values of input image data by an image reproducing apparatus.
Figure 10:
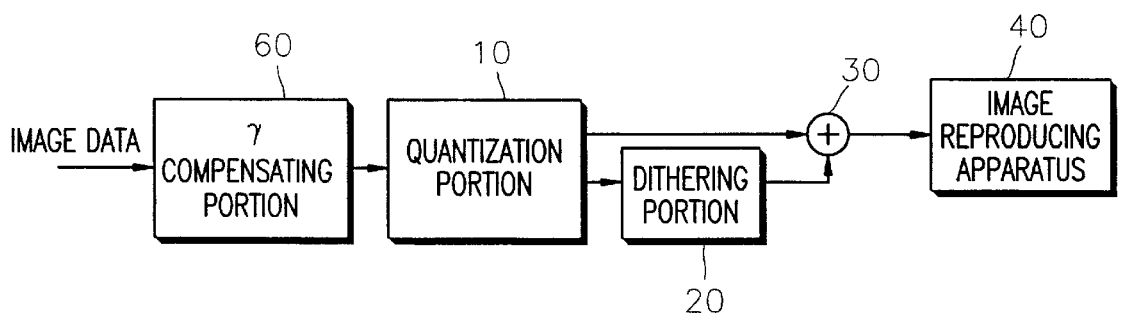
FIG. 10 is a block diagram illustrating an image data processor according to another preferred embodiment of the present invention.

Comparison data between the gray scale values of input image data and the recording concentrations of the image reproducing apparatus 40 is obtained by detecting a recording concentration reproduced with respect to n pixels by the image reproducing apparatus 40 after image data processing, when as many image data values as the number of elements in a dithering matrix set as n is input with gray scale values that are the same in pixels. FIG. 9 shows an example of a graph comparing the gray scale value of the input image data with the recording concentration reproduced by the image reproducing apparatus 40 in response to the gray scale value. In order to compensate for the differences as shown in FIG. 9, a gamma (γ) compensating portion 60 is further installed before the quantization portion 10 to compensate for the gray scale values of image data in accordance with the concentration reproduction characteristics of the image reproducing apparatus 40, as shown in FIG. 10. The same reference numerals as those in FIG. 1 denote the same members.

Referring to FIG. 9, when the gray scale value of input image data is 85, the gamma compensating portion 60 compensates the data to be output to the quantization portion 10 by changing the gray scale value input as 85 into 110, in order to allow the image reproducing apparatus 40 to reproduce a recording concentration of 85. The gamma compensating portion 60 compensates for a gray scale value input as any one integer value between 0 and 225 and outputs image data compensated by the above method to the quantization portion 10.

Alternatively, the element values in the dithering matrix can be controlled without installing the gamma compensating portion 60. If the results as in FIG. 9 are obtained by using the dithering matrix of FIG. 3, some or all of the element values in the dithering matrix are increased or decreased so that the gray scale value of input image data is consistent with the recording concentration of the image reproducing apparatus 40. When image data is processed after the element values of the dithering matrix are controlled in this way, concentrations corresponding to input gray scale values can be reproduced by the image reproducing apparatus 40.

In the above, processing of input image data with gray scales expressed in 256 levels was described, but also image data input with gray scales expressed in 128 levels, 64 levels or 16 levels can be processed through application of the above-described principle.

An image data processor performing the above-described data processing method can be applied to a video controller for processing image data in a printer and outputting processed results to an engine to perform printing. The vide controller is programmed to perform the data processing described above.

The image data processor according to the present invention as described above, allows an image reproducing apparatus that can express a pixel in a few gray scale levels to reproduce an image having a gradation similar to an image of original image data without greatly degrading the resolution of the image.

The foregoing paragraphs describe the details of an image data processor, and more particularly, of an image data processor for processing image data input having gray scale information into a form which is appropriate for an image reproducing apparatus whose ability to express a pixel in gray scale is restricted to only a few levels.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
an image data processor receiving image data with gray scale information corresponding to pixels, processing to the received image data, and outputting the processed image data to an image forming unit, the image forming unit outputting data conforming to a predetermined number of gray scale levels, the received gray scale information corresponding to a plurality of gray scale values including a maximum gray scale value;
said image data processor determining a reference value equal to a quotient obtained by dividing said maximum gray scale value by a result obtained when a number 1 is subtracted from said predetermined number of gray scale levels, identifying a block of pixels corresponding to a two-dimensional matrix having dimensions equal to ((said predetermined number of gray scale levels)× (said predetermined number of gray scale levels)), said image data processor further comprising:
a quantization portion dividing each of said gray scale values by said reference value to obtain a plurality of quotients and remainders, each quotient and remainder corresponding to a respective one of said gray scale values, and separately outputting said quotients and said remainders;
a dithering portion receiving said remainders, reading predetermined element values of a two-dimensional dithering matrix having dimensions equal to said dimensions of said block of pixels, comparing said respective predetermined element values with said respective remainders at corresponding positions of said block of pixels, and outputting results of said comparing as binary bits; and
a mixer receiving said quotients and said binary bits, adding said respective quotients to said respective binary bits at corresponding positions, and outputting respective resultant sums to the image forming unit.

2. The apparatus of claim 1, further comprising said image forming unit corresponding to a printer recording data onto a recordable medium.

3. The apparatus of claim 1, further comprising said image forming unit corresponding to a video display conveying varying visual information to a user.

4. The apparatus of claim 1, further comprising said predetermined element values of said dithering matrix being set to gradually increase in a direction from a center of said dithering matrix to a periphery of said dithering matrix.

5. The apparatus of claim 1, said image data processor further comprising:
a gamma compensating portion receiving the image data and being coupled to said quantization portion, modifying said gray scale values of the received image data in accordance with gradation reproduction characteristics of the image forming unit to compensate for a difference generated between a first recording concentration reproduced by the image forming unit and a second recording concentration corresponding to said gray scale values when said gray scale values of the received image data are input to said quantization portion without change, and outputting said modified gray scale values to said quantization portion.

6. An apparatus, comprising:
an image data processor for processing image data input with gray scale information corresponding to pixels in response to a number of divided-per-pixel gray scale levels that can be expressed by an image reproducing unit and for outputting the processed image data to the image reproducing unit, said image data processor further comprising:
a quantization portion for dividing gray scale values corresponding to the pixels of input image data by a comparison reference value set to be a gray scale value between gray scale levels in which the image reproducing unit can express a pixel, and separately outputting the quotients and remainders of the division;
a dithering portion for comparing the element values in a set dithering matrix with the remainder values at corresponding comparison positions and outputting the results of the comparison as binary bits; and
a mixer for adding the quotients output by the quantization portion to the binary bits output by the dithering portion and outputting the sum to the image reproducing unit.

7. The apparatus of claim 6, further comprising a quotient being obtained by dividing a maximum gray scale value in which the image data is expressed, by a value obtained by subtracting one from the number of gray scale levels in which the image reproducing apparatus can express for each pixel, and said quotient can be set as the comparison reference value of the quantization portion.

8. The apparatus of claim 6, further comprising the element values in the dithering matrix being set to gradually increase in the direction from the center to the periphery of the matrix.

9. The apparatus of claim 6, further comprising:
a gamma compensating portion installed before the quantization portion for compensating for the gray scale values of the image data in accordance with the gradation reproduction characteristics of the image reproducing unit in order to compensate for the difference generated between a recording concentration reproduced by the image reproducing unit and a recording concentration corresponding to the gray scale value when the gray scale value of the image data is input to the quantization portion without change.

10. An apparatus, comprising:
an image data processor receiving image data with gray scale information corresponding to pixels, processing the received image data, and outputting the processed image data to an image forming unit, the image forming unit outputting data conforming to a predetermined number of gray scale levels, the received gray scale information corresponding to a plurality of gray scale values including a maximum gray scale value, said image data processor further comprising:
a quantization portion dividing each of said gray scale values by a reference value to obtain a plurality of quotients and remainders, each quotient and remainder corresponding to a respective one of said gray scale values, and separately outputting said quotients and said remainders;
a dithering portion receiving said remainders, reading predetermined element values of a dithering matrix, comparing said respective predetermined element values with said respective remainders at corresponding positions, and outputting results of said comparing as binary bits; and a mixer receiving said quotients and said binary bits, adding said respective quotients to said respective binary bits at corresponding positions, and outputting respective resultant sums to the image forming unit.

11. The apparatus of claim 10, further comprising said predetermined element values of said dithering matrix being set to gradually increase in a direction from a center of said dithering matrix to a periphery of said dithering the matrix.

12. The apparatus of claim 10, said image data processor further comprising:

a gamma compensating portion receiving the image data and being coupled to said quantization portion, modifying said gray scale values of the received image data in accordance with gradation reproduction characteristics of the image forming unit to compensate for a difference generated between a first recording concentration reproduced by the image forming unit and a second recording concentration corresponding to said gray scale values when said gray scale values of the received image data are input to said quantization portion without change, and outputting said modified gray scale values to said quantization portion.

13. The apparatus of claim 10, further comprising said reference value being equal to a quotient obtained by dividing said maximum gray scale value by a result obtained when 1 is subtracted from said predetermined number of gray scale levels.

14. The apparatus of claim 13, further comprising said apparatus identifying a block of pixels corresponding to a two-dimensional matrix having dimensions equal to ((said predetermined number of gray scale levels)×(said predetermined number of gray scale levels)).

15. The apparatus of claim 14, further comprising said dithering matrix having dimensions equal to said dimensions of said block of pixels.

16. The apparatus of claim 10, further comprising said image forming unit corresponding to a printer recording data onto a recordable medium.

17. The apparatus of claim 16, said image data processor further comprising:

a gamma compensating portion receiving the image data and being coupled to said quantization portion, modifying said gray scale values of the received image data in accordance with gradation reproduction characteristics of the image forming unit to compensate for a difference generated between a first recording concentration reproduced by the image forming unit and a second recording concentration corresponding to said gray scale values when said gray scale values of the received image data are input to said quantization portion without change, and outputting said modified gray scale values to said quantization portion.

18. The apparatus of claim 10, further comprising said image forming unit corresponding to a video display conveying varying visual information to a user.

19. The apparatus of claim 18, further comprising said video display corresponding to a cathode ray tube.

20. The apparatus of claim 18, further comprising said video display corresponding to a liquid crystal display.

* * * * *